(12) United States Patent
Jennings, III et al.

(10) Patent No.: US 6,760,763 B2
(45) Date of Patent: *Jul. 6, 2004

(54) SERVER SITE RESTRUCTURING

(75) Inventors: Raymond Byars Jennings, III, Ossining, NY (US); Dinesh Chandra Verma, Millwood, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,795

(22) Filed: Aug. 27, 1999

(65) Prior Publication Data

US 2003/0220998 A1 Nov. 27, 2003

(51) Int. Cl.[7] .............................................. G06F 15/173
(52) U.S. Cl. ...................... 709/224; 709/221; 709/226; 709/233; 707/8; 707/10; 707/201; 714/20; 714/45
(58) Field of Search ................................. 709/221, 224, 709/226, 233; 703/2; 707/10, 201, 8; 714/45, 20; 395/610; 717/168

(56) References Cited

U.S. PATENT DOCUMENTS

| | | | | |
|---|---|---|---|---|
| 5,787,253 A | | 7/1998 | McCreery et al. | 709/231 |
| 5,913,041 A | | 6/1999 | Ramanathan et al. | 709/233 |
| 5,931,912 A | | 8/1999 | Wu et al. | 709/224 |
| 5,956,489 A | * | 9/1999 | San Andres et al. | 709/221 |
| 5,978,577 A | * | 11/1999 | Rierden et al. | 395/610 |
| 5,991,804 A | | 11/1999 | Bolosky et al. | 709/221 |
| 6,070,191 A | * | 5/2000 | Narendran et al. | 709/226 |
| 6,112,238 A | | 8/2000 | Boyd et al. | 709/224 |
| 6,173,418 B1 | * | 1/2001 | Fujino et al. | 714/20 |
| 6,195,622 B1 | | 2/2001 | Altschuler et al. | 703/2 |
| 6,219,676 B1 | | 4/2001 | Reiner | 707/201 |
| 6,247,149 B1 | | 6/2001 | Falls et al. | 714/45 |
| 6,311,194 B1 | * | 10/2001 | Sheth et al. | 715/505 |
| 6,317,786 B1 | * | 11/2001 | Yamane et al. | 709/224 |
| 6,317,787 B1 | | 11/2001 | Boyd et al. | 709/224 |
| 6,338,066 B1 | | 1/2002 | Martin et al. | 707/10 |
| 6,360,261 B1 | | 3/2002 | Boyd et al. | 709/224 |
| 6,449,734 B1 | * | 9/2002 | Shrivastava et al. | 707/8 |
| 6,453,468 B1 | * | 9/2002 | D'Souza | 717/168 |
| 6,480,885 B1 | * | 11/2002 | Olivier | 709/207 |
| 6,661,431 B1 | * | 12/2003 | Stuart et al. | 345/733 |
| 2003/0236887 A1 | * | 12/2003 | Kesselman et al. | 709/226 |

* cited by examiner

*Primary Examiner*—Hosain Alam
*Assistant Examiner*—Thu Ha Nguyen
(74) *Attorney, Agent, or Firm*—Thomas A. Beck; Louis P. Herzberg

(57) ABSTRACT

This invention provides methods and apparatus which provide a solution to the problem of server load balancing. Log files are collected from each server within a server cluster. The log files are analysed by the monitoring process to find file relations. The analysis uses a window to search for requests such that a file relation is established. Other techniques are described to establish file relations. Based on file relations files are merged into groups such that these groups of files can be distributed to N servers within a server cluster. The file merging process continues until there are N groups corresponding to the N servers. The files for each group are either distributed to each server, or all files are distributed to all servers and each server activates only the subset which comprises the group of files for that server. Once all files have been distributed to the servers, each server updates any links that point to other files that now may reside in a different location due to the redistribution of files.

26 Claims, 7 Drawing Sheets

SERVER SITE RESTRUCTURING

FIELD OF THE INVENTION

This invention is directed to the field of computer networks. It is more particular directed to computer servers, server clusters, server content and server administration.

BACKGROUND OF THE INVENTION

There is a continuous desire to reduce the time it takes for a client to obtain the content it requests from a server. This applies for example both within the context of a corporate Intranet as well as the Internet. An example of a typical server is a web server used within the context of a web site. A common problem among high performance and/or popular web sites is that the web servers cannot serve pages at a fast enough rate when the maximum capacity of a particular web server is reached. A common architecture for high performance web sites consists of a set of web servers using a static configuration for web content. Other sites often use one of the methods described below.

One method provides load balancing by having a network dispatcher first receive web based client packets on an ingress interface. The dispatcher modifies the destination address to be that of one particular web server from the set of web servers located at the egress point of the network dispatcher. The network dispatcher determines which web server is least heavily loaded in order to forward the client's request to that server. The network dispatcher is generally limited to a local area network (LAN) environment in that all web servers are at a point behind the network dispatcher. In addition, the network dispatcher becomes the bottleneck for all network traffic destined to the servers and needs to have a minimum connection rate which is the sum of the connection rates of all the servers it is handling for optimal performance. Also, the dispatcher becomes a single point of failure. Given these issues, use of the network dispatcher method does not scale well.

Still another approach uses a dynamic Domain Name Service (DNS). This approach is accomplished by having a dynamic DNS server which receives requests from clients requesting a network address of well known host names. The DNS server responds to the client by selecting one network address from a set of available addresses for the particular host name typically in a round robin manner. This approach allows a server's name to be mapped to a set of multiple servers, each with a different network address. This approach is limited in that it does not take into account the current or recent load on the server.

Another approach uses a broadcast medium whereby the client's request is broadcast to all servers within a group. Each server decodes the client's address and makes a determination as to whether or not to handle this request based on the client's address. This implementation requires that all web servers listen to all client requests and discard those that are not within the configured range.

SUMMARY OF THE INVENTION

It is therefore an aspect of the present invention to provide a method for restructuring server content so as to distribute network traffic over a group of servers. The method provides a monitoring process which collects log files from a set of servers and analyzes them to find file relations. It merges files into groups based on a relation and on a specified configuration of the servers. The analysis also includes employing measurements of server traffic on a file basis and establishing a traffic load target for each server. The results of the analysis are then distributed to the set of servers within the group where the content is either distributed to a specific server or made active on a specific server.

It is another aspect of the invention to provide a method whereby files are relocated among servers and links to file locations are updated to show the new location of the files.

It is a further aspect of the invention to provide an apparatus, a computer product and an article of manufacture comprising a computer usable medium having computer readable program code means embodied therein for causing a computer process to be capable of restructuring and distributing the content among a set of servers. These implement a method such as to enable dynamic load balancing of a set of servers in a server cluster.

In an example of the invention, a web site monitoring process collects web server logs from a set of web servers. An algorithm is run on the web server logs to determine the number of times each file is requested and the size of each request and to determine any related files. The monitoring process creates groups of files based on these criteria and further combines groups of files until there exists a set of N groups of files where N is the number of servers in the cluster. All of the newly created sets of files are communicated to all servers in the group through an auxiliary process, or though the CGI based URL in the case of a web server. The content at each server is made active by transferring the content to each server.

In an alternative embodiment all content is stored on every server. Only a subset of the stored files is activated on each server as required by the utilization. Each server searches the content local to itself and modifies any content having a link to files that have been moved or deactivated by the monitoring process to another server in the group.

In an example embodiment the server site monitor includes a server log store to store log file information about each server in a server cluster, a file statistic database used to build relations about files, and a file group database where files groups are stored in order to send group information to each server within the server cluster.

BRIEF DESCRIPTION OF THE DRAWINGS

These and other aspects, features, and advantages of the present invention will become apparent upon further consideration of the following detailed description of the invention when read in conjunction with the drawing figures, in which.

Other objects and a better understanding of the invention may be realized by referring to the detailed description.

DESCRIPTION OF THE INVENTION

Figure 1:
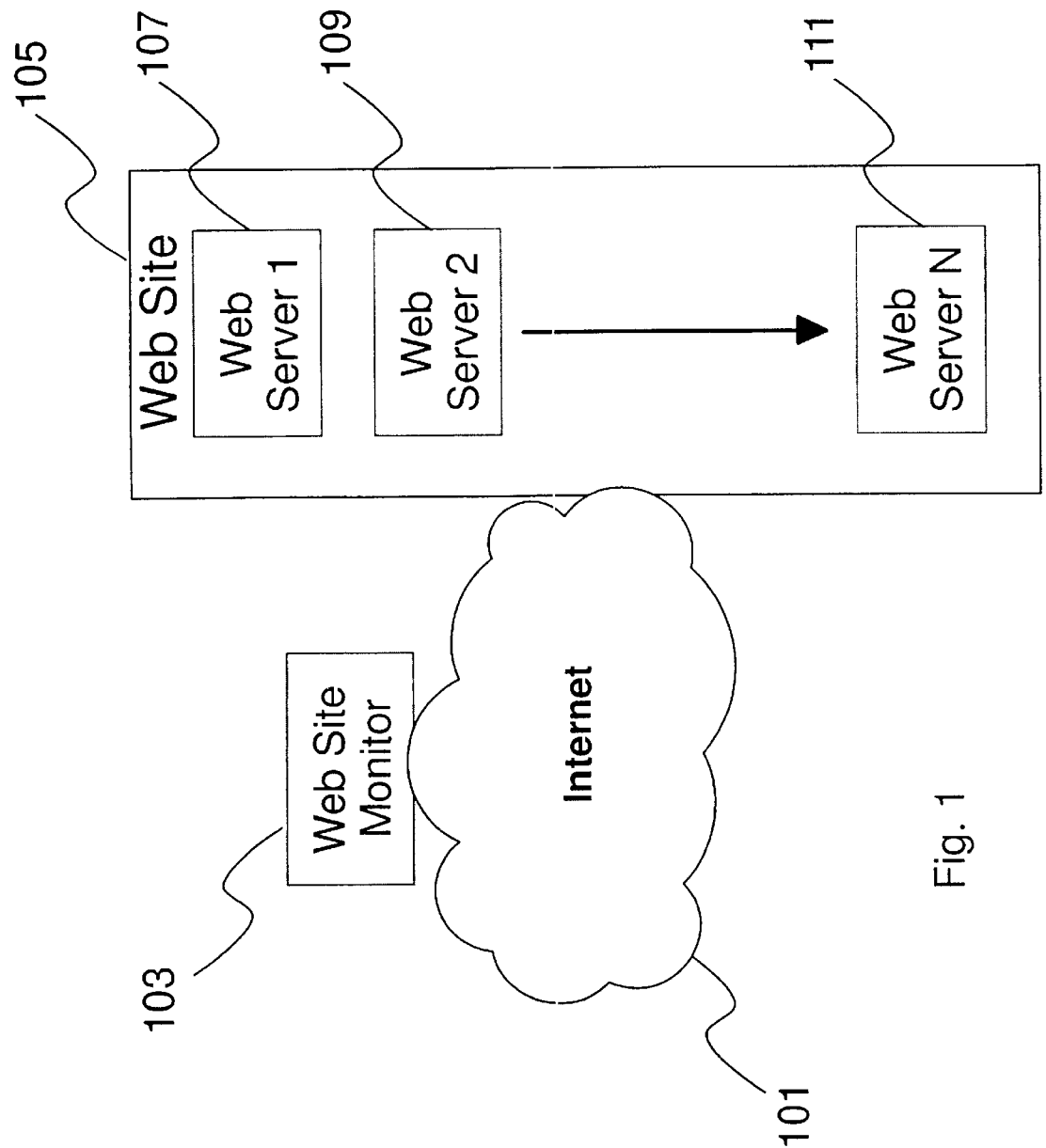
FIG. 1 shows an example of an environment having a set of servers and a server monitoring device.

The present invention provides methods and apparatus for monitoring, controlling, restructuring and/or redistributing server content for a group of servers within a server cluster. An example network context within which this invention applies is shown in FIG. 1. It shows a server site 105 having a set of servers 107, 109, 111 connected to the Internet 101. A site monitor 103 is also connected to the Internet 101. A similar context arises in a corporate Intranet, wherein the Internet 101 is replaced by the corporate network instead of the Internet. Within this context, the site monitor 103 obtains traffic information from each of the web servers 107, 109, 111. A process is implemented on the site monitor 103 as either running on a non-dedicated machine or a dedicated machine which is located anywhere within the Internet. The machine has access to obtaining the traffic log files.

In an example embodiment of the present invention the web site monitor 103 obtains the web server log information by using through an application like FTP, through a network type file system like NFS, or through a CGI script on a web server. Other techniques known to those familiar with the art may also be used. The web site monitor 103 requests the web server logs at either periodic intervals, for example every hour, every 24 hours, or when an event is triggered. The periodic time interval is dependent upon how large the overall server cluster is. This includes the number of servers within the cluster, the amount of content at the site, and how many requests are being made to the site. The larger the site in terms of servers, the longer it takes to collect all of the log files from each server. Likewise, the more requests made to each server the longer it takes to analyze each log file. The time interval reflects all of these conditions as well as how important the server site load balancing is needed. Some sites may be considered mission critical in nature and would require a shorter interval for the load balancing process. Other less important sites may only require load balancing on a daily or weekly basis. In addition, some sites could have low-peak periods or down time periods when the network is not accessible to outside clients. In these cases, these periods are used to run the load balancing process.

In an example embodiment, a particular event causes the log files to be requested thereby eliminating any issue relating to time. For example, the load balancing process can be triggered by the log files reaching a certain size. Often, the size of each file group is based on a configuration of each particular server wherein the configuration describes the available space, processing power and/or bandwidth of the server. In this example the load balancing process runs more frequently as there are more requests made to the server site. This could be used where a site was being used to serve requests that were dependent on some external source such as world news. In another example an event could be triggered when the network was about to be shut down, signaling to the monitoring process that load balancing could either begin at that time or should start upon the network being restarted.

Figure 2:
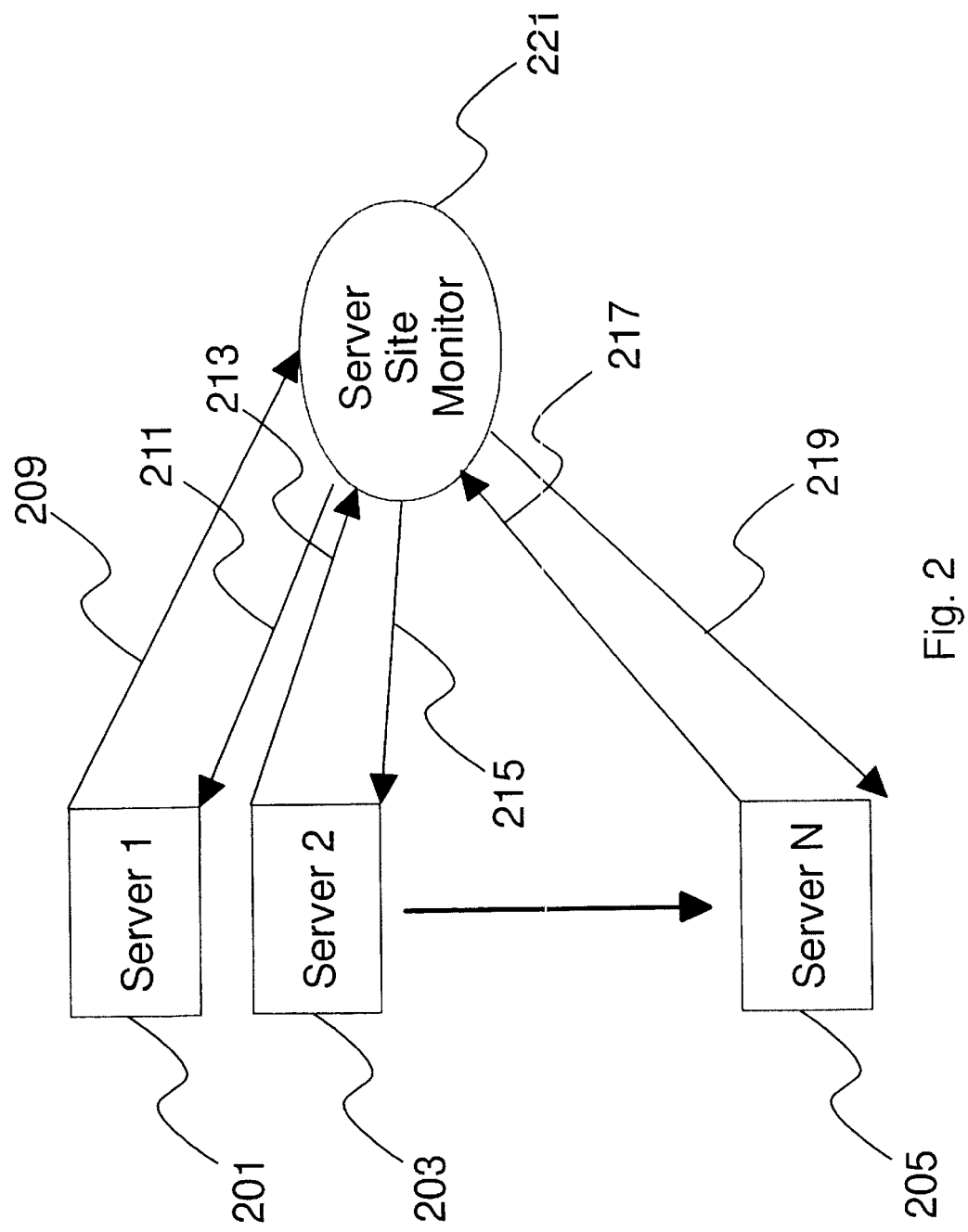
FIG. 2 shows an example of the structure for performing load balancing.

FIG. 2 shows a server monitor process 221 which retrieves server logs. The server monitor process 221 receives each server log file using links 209, 213, 217 emanating from the set of servers 201, 203, 205. Once all of the log files have been received by the monitor process 221, an algorithm is run on the log files and the results of the algorithm are sent to each server using links 211, 215, and 219. The monitor process 221 receives the server log files through normal network or file access means.

In an embodiment in which the monitor process 221 is located remote to the servers 201, 203, 205, a standard file transfer application like FTP or HTTP can be used. In an embodiment which uses a networked file system for the servers, a standard network file system like NFS can be used to obtain the server log files. Other means can also be utilized by the monitor process 221.

In the example of a web site, the web server log files are transferred 209, 213, 217 to the web site monitoring process 221 and the results are returned 211, 215, 219 to each web server 201, 203, 205.

Figure 3:
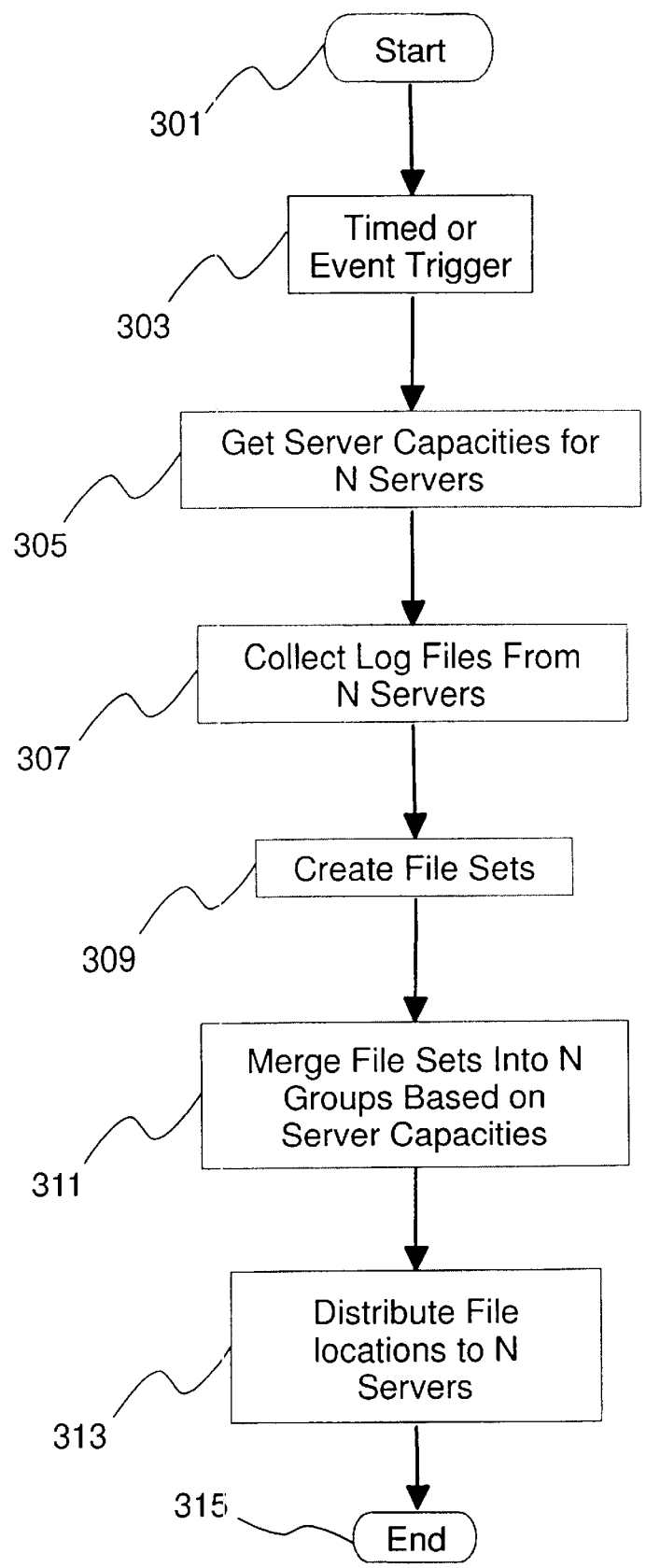
FIG. 3 shows an example of an algorithm to allocate files to each server within a group of servers in accordance with the present invention.

An example of a process flow diagram for the monitor process to redistribute files to a set of servers is shown in FIG. 3. The process starts at 301. A timed or triggered event 303 begins the process whereby a configuration description for each server is obtained 305. This configuration includes a description of the server capacities. It is assumed that the cluster includes N servers. For example, the capacity can be given as a weighted value compared to the weighted values of the other N−1 servers in a server cluster. The server log files are obtained in step 307. File sets are created in 309 by finding within the log files, files that are in close proximity and closely related. Close proximity files are those which are generally requested anytime some other file is requested. Using the example of a web site, an example of closely related files would correspond to URLs, wherein a main HTML page and all of the images that are referenced within that page are closely related. Other embodiment use different techniques to determine close proximity files. This often depends upon the amount of information that is available within the server log files. In the example of a web site, a server's log file often includes: the client's network address, the file being requested, the time of day of the request, the protocol used for the transfer of the file, the length of the transfer in bytes and the results of the transfer (error or non error).

An example embodiment employs a process for restructuring a web site as follows. The process starts at the beginning of a log file and looks at each record, one at a time. An initial time window is specified to be some amount of time, typically on the order of seconds. Each entry within the log file is compared with all other entries within the specified time window. If host address fields of two or more files match within the time window, these files are grouped together and are considered to be closely related. In the case of a web site, a further test is sometimes performed. This test looks at the protocol fields. Some web based application layer protocols such as HTTP 1.1, indicate that all files obtained from the first matching entry to the last matching entry are all closely related because they were all requested over one network connection, thereby being related. This process continues by moving the time window ahead in some quantum time increments, e.g. one second, to create a new time window. A search for more file sets is performed at each new time window.

The length of the time window can be made to vary dynamically. This often depends upon how many entries are present in the log files. The more requests that are present within a time interval the larger is the specified time window. This is used to account for delays within a busy server. The time window is sometimes made to be some static amount of time plus some dynamic amount of time. The dynamic amount is proportional to the number of entries within one time quantum. An example embodiment uses a five second time window, For every 1000 entries within the time window the process adds one second up to some maximum time limit, say 10 seconds. The adjustment of the time window allows for server log files that have peak periods wherein the number of entries is much larger than at other times. At the peak periods, requests made to a server may take a longer duration to satisfy. This is taken care of by expanding the time window when searching for close proximity files.

Once an initial set of close proximity files is formed, the next step is to further group files together by merging file groups to create larger groups 311. This merging process is done by finding common relations among the initial file groups. In some situations certain files are common to two or more groups. These two or more groups can be merged into one group based on the frequency of the common files within these two groups.

Another example of a method for merging file groups uses the determination of network traffic pertaining to the requests. There may be a group having a small number of files that are either large in size or for which the number of requests is large. Thus, the amount of traffic for the aggregate is large. In this case, since this group represents a large amount of the total network traffic for the server group it is best not to merge additional files with this group. This is determined by implementing a merging policy. The merging policy continues until there are N file groups, which corresponds to having one group for each server. Thus returning to FIG. 3, the merging process 311 continues until there are as many groups as there are servers 311. The results of the process are distributed to the N servers within the server cluster 313. The process ends at 315.

Since each server has its own target load, the N groups may be unequal in size. The target load is specified in a configuration file and generally given as a percentage of the total amount of the site's load. The final stage of merging file groups merges any remaining groups such that the portion of network traffic is relative to each server's target load as close as possible. Typically, a best fit approach for merging any remaining groups is used to ensure that the final number of groups is equal to the number of servers within the server cluster.

Figure 4:
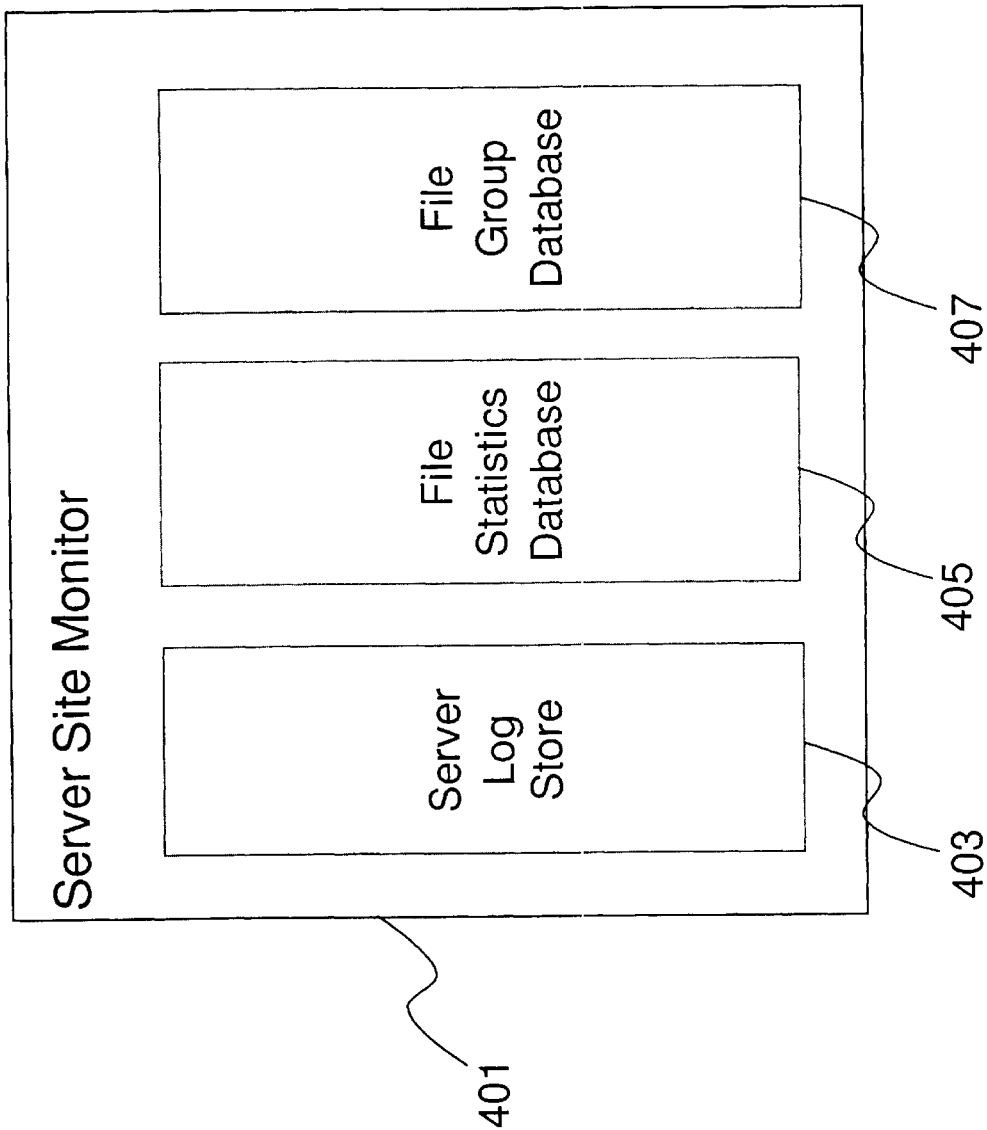
FIG. 4 shows an example of the structure of a monitor in accordance with the present invention.

FIG. 4 shows an example of a structure of the server site monitor 401. The server site monitor 401 includes a server log store 403 and a file statistics database 405. The database keeps records of each file, the number of requests made, and the amount of network traffic generated for each request. The file group lists 407 is a database formed by the merging of files into appropriate groups. It is used when the results of running the process are distributed to all of the servers within the cluster.

Figure 5:
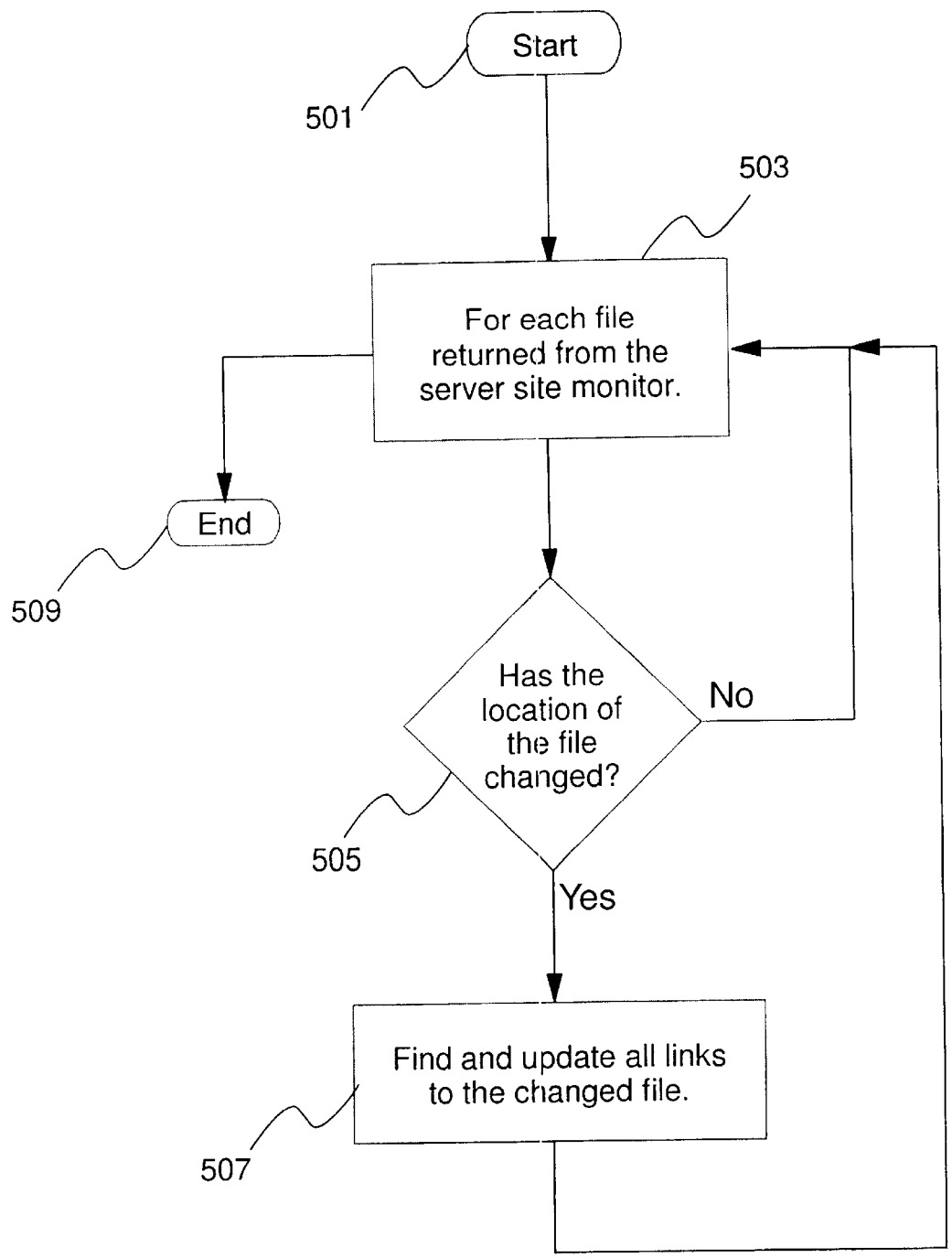
FIG. 5 shows an example of how a server handles the response from the monitoring process in accordance with the present invention.

FIG. 5 shows a flow diagram for an example of how each server handles the results returned to it by the site monitor. The process is started at 501. The results returned by the monitor process determine which files are active, or only located, on which server within the server cluster. Each file returned in the results from the monitor, is received and examined 503. A check is made to determine if the location of the content of a file changed 505. If the content changed, then a local search at the server is performed and all references to the specified content are changed to show the new location 507. The process ends at 509.

The process of searching for and editing content is often accomplished by a local process. In the case of a web server, it uses a CCI script running on the web server. The content located at a server can be made active by either sending all content that is to be active at each particular server to that server or by sending all content to all servers and notifying each server what content is to be made active and, which are to remain inactive.

Figure 6:
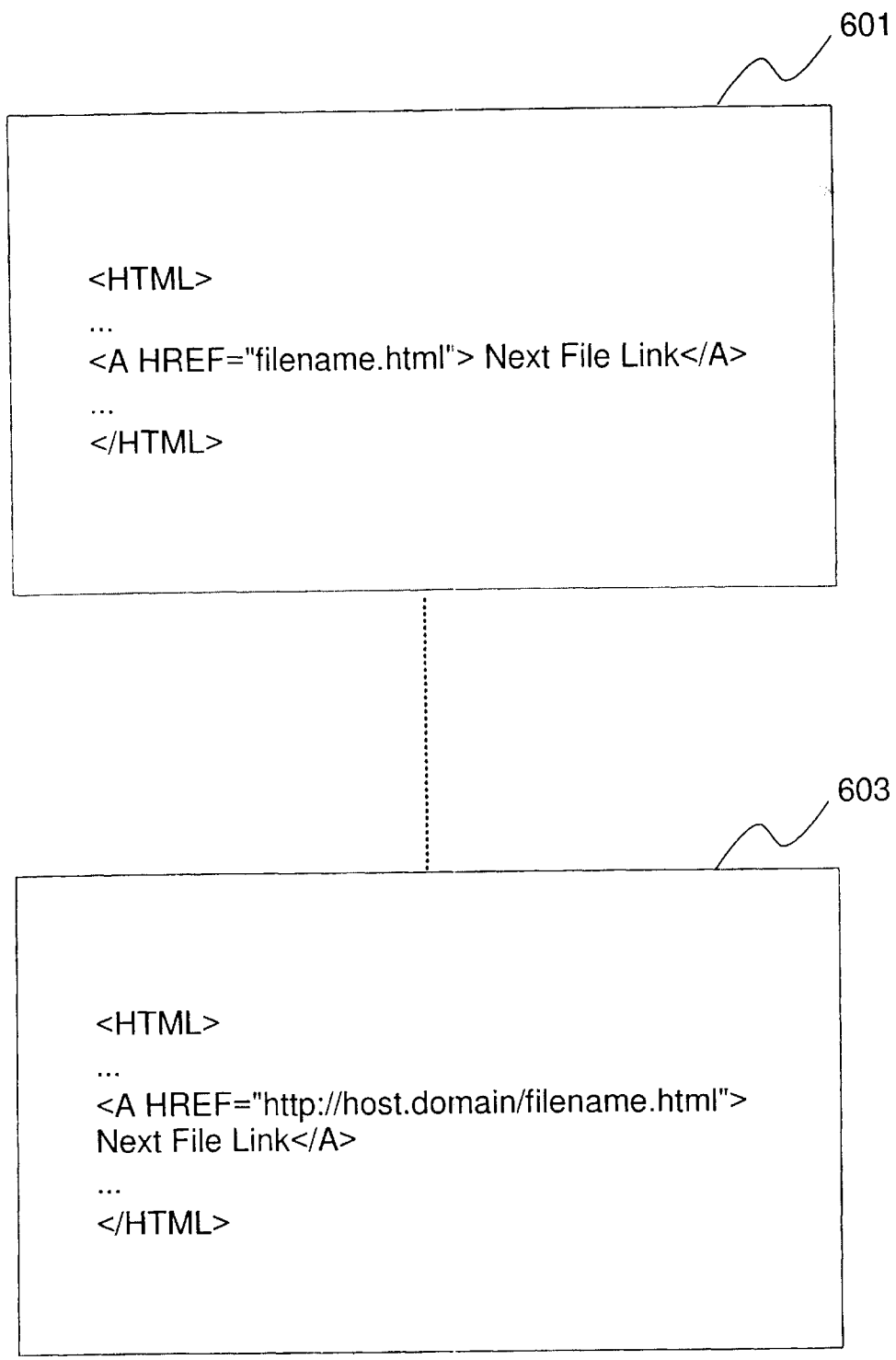
FIG. 6 shows an example of how web based content pages are modified as a result of reorganizing the web content in accordance with the present invention.

FIG. 6 shows an example using HTML. It shows a case when an embedded URL referring to a file "A HREF" named "filename. html" 601 has been moved from the local web server to another web server. The content is changed to show that the same file "A HREF" is now active on another web server whose name is "host.domain" 603.

An apparatus implementing the present invention for restructuring content of 'N' servers in a servers cluster can be implemented as one or more computer processes is running on a computer or can be implemented as a dedicated machine. The apparatus generally includes a means for obtaining a log file from each of the servers whereby the means may use network services already available within the network infrastructure. The apparatus also includes a means for analyzing each entry in each log file for a file relation which is implemented as computer code. The end result of running this computer code is that the files are merged into 'N' file groups, wherein each file within each file group satisfies a relation and/or the file is made part of a group in order to target load requirements for a particular server within the server cluster.

Figure 7:
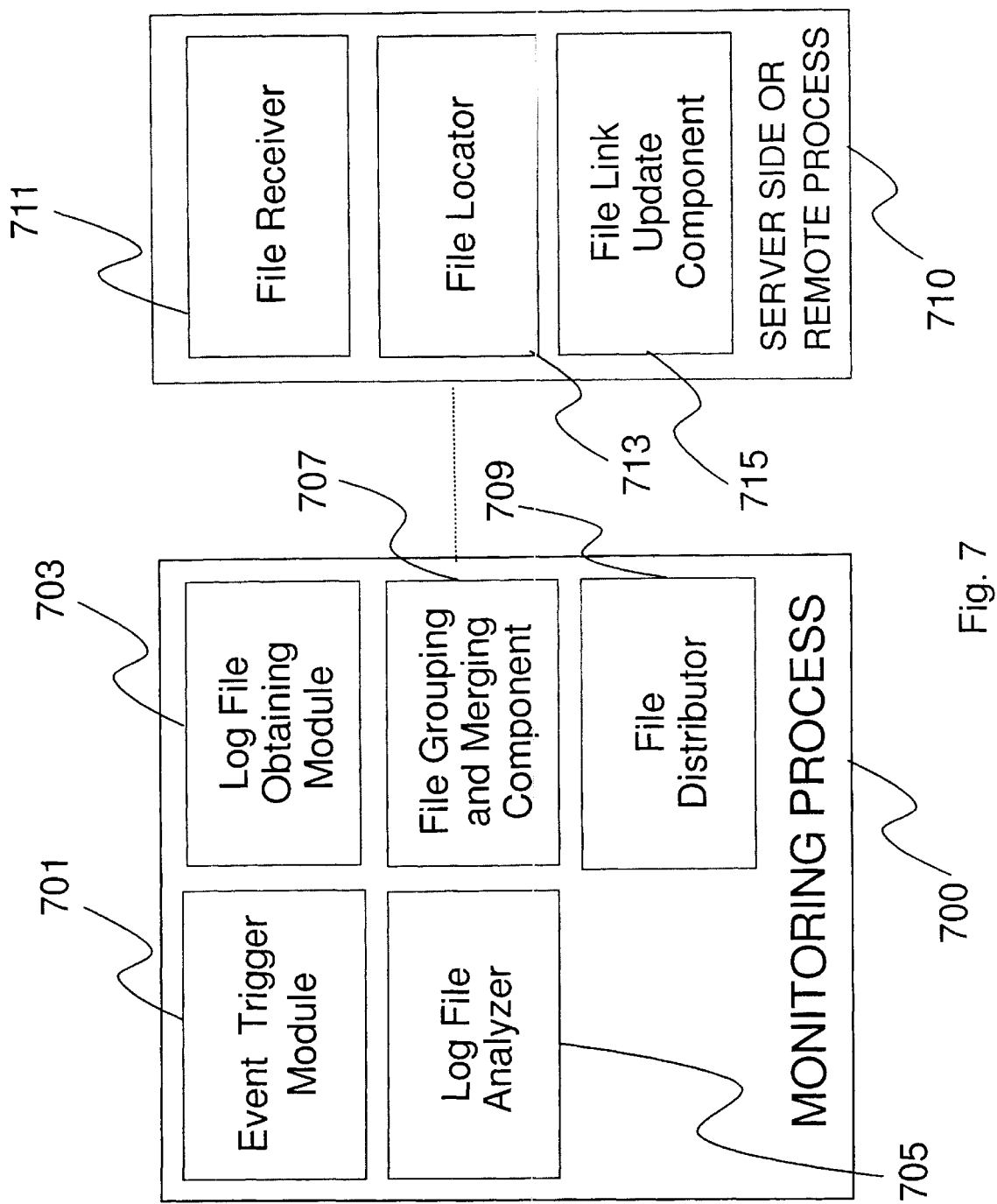
FIG. 7 shows an example apparatus used for a system to perform server site restructuring in accordance with the present invention.

FIG. 7 shows an example apparatus implementing the present invention. It shows a 'monitoring process' 700 which includes: an 'event trigger module' 701 to monitor and provide a trigger on an event; a 'log file obtaining module' 703 to obtain log files from the servers; a 'log file analyzer' 705 to analyze the log files for a relation; a 'file grouping and merging component' 707 to form groups by merging files based on one or more relations; and a 'file distribution module' 709 to distribute the file groups to the servers. The 'monitoring process' 700 is coupled to a 'server side or remote process' 710. The 'server side or remote process' 710 includes: a 'file receiver' 711 to receive files as allocated for each server; a 'file locator' 713 to locate the files of each group to each server; and a 'file link update component' 715 to update the files in each of the servers as the usage environment varies.

Thus an embodiment of the present invention provides a method for restructuring content of 'N' servers in a server cluster. The method includes the steps of: obtaining a log file from each of the servers of files included in the cluster; analyzing each file entry in each log file for a file relation; and merging all files into 'N' file groups wherein each file group satisfies a common file relation.

In some embodiments of the method the step of merging includes forming file groups. Each file group is based on a configuration of each particular server. The method includes distributing each file group to a corresponding server, and/or making available data corresponding to each file in the file group at the corresponding server. Sometimes the step of making available includes: determining movement of a file location based on the step of merging, relocating file data based on results of the step of merging, and updating file links in each of the servers in accordance with the step of relocating. The step of relocating sometimes includes: providing each server with the contents of all files, and activating in each particular server files that are included in the group corresponding to the particular server. The step of making available sometimes includes storing file-data for all files in the group corresponding to the particular server at each particular server. The step of analyzing sometimes includes: employing measurements of server traffic on a file-by-file basis, and establishing a traffic load target for each server. Often, the traffic load target is given as a percentage of the total load of all servers. In some embodiments the steps of obtaining, analyzing, and merging is repeated at a periodic interval; and/or the step of updating is repeated in response to an event. The step of obtaining sometimes includes using a CGI script to return the log file data.

In another embodiment, the invention provides a method for distributing traffic load on a group of servers. The method includes searching log files for entries that are related. This is performed by using a dynamically varying time window, calculating the number of times a file is requested and the size of each request during the time window, and distributing the traffic load based on the results of the step of calculating.

Still another embodiment of the invention provides a method for restructuring content at a web site having a plurality of servers. The method includes the steps of: obtaining a log file from each of the servers; analyzing each entry in each log file for a URL relation; and merging URLs into URL groups based on a relation rule. In some embodiments, the method further includes the steps of making available data corresponding to each file in a URL group at the corresponding server.

Still another embodiment of the invention provides an apparatus for restructuring content of 'N' servers in a servers cluster. Each server has at least one file. The apparatus includes: means for obtaining a log file from each of the servers; means for analyzing each entry in each log file for a file relation; and means for merging files into 'N' file groups, wherein each file group satisfies a common file relation. In some embodiments, the means for merging files includes a means for forming file groups based on a configuration of each particular server.

In some cases, the apparatus further includes means for distributing to distribute each group to a corresponding server, and/or means for making available data corresponding to each file in a group at the corresponding server. The means for making available sometimes includes: means for determining movement of any file from a first file location to a second file location, means for relocating file data of the any file to the second location, and means of updating file links in each of the servers in accordance with the second location for the any file. Sometimes the means for relocating includes: means for providing each server with the contents of all files, and means for activating in each particular server all files that are included in the group corresponding to the particular server. The apparatus sometimes includes means for storing file data for all files in the group at each particular server. In some cases the means for analyzing includes means for employing measurements of server traffic on a file-by-file basis, and means for establishing a traffic load target for each server.

In still another embodiment, the invention provides an apparatus for restructuring content at a web site having a plurality of servers. The apparatus includes: means for obtaining a log file from each of the servers; means for analyzing each entry in each log file for a URL relation; and means for merging URLs into URL groups based on a relation rule.

Still another embodiment of the invention provides an article of manufacture comprising a computer usable medium having computer readable program code means embodied therein for effecting a method of the present invention.

In still another embodiment, the invention provides a computer program product comprising a computer usable medium having computer readable program code means embodied therein for causing a computer to effect a method of the present invention.

Still another embodiment the invention provides a program storage device readable by machine, tangibly embodying a program of instructions executable by the machine to perform method steps to effect a method of the present invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for restructuring content of 'N' servers in a server cluster, comprising:

obtaining, by a server site monitor, a log file from each of the servers included in said cluster; said log file containing entry elements comprising URL, date/time and user information;

analyzing each entry element in each log file for a file relation by employing measurements of server traffic on an element-by-element basis and establishing a subset of URL's for each server, said subsets consisting of all URL's within said server cluster, wherein said URLs within each said subset are unique, are not found in any other subset and are not cached;

dividing all URLs into 'N' URL groups, by forming URL groups, wherein each URL group is based upon a configuration of each particular said server;

providing each server with contents of the corresponding subset of URLs and activating said subset of URLs in each particular server, and updating URL links in each of the servers in accordance with said URL relocation, if relocated.

2. The method as recited in claim 1, wherein the traffic load target is given as a percentage of the total load of all servers.

3. The method as recited in claim 1, wherein at least one of the steps of obtaining, analyzing and merging is repeated at a periodic interval.

4. The method as recited in claim 3, the interval is 24 hours.

5. The method as recited in claim 1, wherein the step of updating is repeated in response to an event.

6. The method as recited in claim 5, wherein the event is a server log file exceeding a particular size.

7. The method as recited in claim 1, wherein the step of obtaining includes using a CGI script to return the log file data.

8. The method as recited in claim 1, wherein the 'N' servers form a web site.

9. The method as recited in claim 8, wherein said web site is a corporate site.

10. The method for restructuring content of a server at a web site having a plurality of servers, comprising:

obtaining by a server site monitor, a log file from each of said servers;

said log file containing entry elements comprising URL, data/time and user information;

analyzing each said entry element in each said log file for a URL relation;

the number of said URL groups being equal to the number of said servers in said web site;

distributing each said URL group to a corresponding server and making available data corresponding to each file in a URL group at the corresponding server; and dividing URLs into URL groups based on a configuration of each particular said server;

providing each server with contents of a corresponding subset of URLs and activating said subset of URLs in each particular server, and updating URL links in each of the servers in accordance with said URL relocation, if relocated.

11. An apparatus for restructuring content of 'N' servers in a server cluster, each server having at least one file, the apparatus comprising:

server site monitor means for obtaining a log file from each of said servers included in said server cluster;

said log file containing entry elements comprising URL, date/time and user information;

means for analyzing each said entry in each said log file for a URL relation by employing measurements of server traffic on an element-by-element basis and establishing a subset of URL's for each server, said subsets consisting of all URL's within said server cluster, wherein said URLs within each said subset are unique, are not found in any other subset and are not cached; and means for dividing all URLs into 'N' URL groups, by forming URL groups, wherein each URL group is based upon a configuration of each particular said server;

means for providing each server with contents of a corresponding subset of URLs and activating said subset of URLs in each particular server, and means for updating URL links in each of the servers in accordance with said URL relocation, if relocated.

12. The apparatus as recited in claim 11, wherein said means for merging files includes a means for forming file groups based on a configuration of each particular server.

13. The apparatus as recited in claim 12, further comprising means for making available data corresponding to each file in a group at the corresponding server.

14. The apparatus as recited in claim 13, wherein said means for making available includes:

means for determining movement of any files from a first file location to a second file location;

means for relocating file data of said any file to said second location; and means of updating file links in each of the servers in accordance with the second location for said any file.

15. The apparatus as recited in claim 14, wherein said means far relocating includes:

means for providing each server with the contents of all files; and means for activating in each particular server all files that are included in the group corresponding to said particular server.

16. The apparatus as recited in claim 14 further comprising a means for storing file data for all files in the group at each particular server.

17. The apparatus as recited in claim 11, further comprising means for distributing to distribute each group to a corresponding server.

18. The apparatus as recited in claim 11, wherein said means for analyzing includes:

means for employing measurements of server traffic on a file-by-file basis, and means for establishing a traffic load target for each server.

19. An apparatus for restructuring content at a web site having a plurality of servers, the apparatus comprising:

server site monitor means for obtaining a log file from each of said servers included in said web site;

said log file containing entry elements comprising URL, date/time and user information;

means for analyzing each said entry in each said log file for a URL relation by employing measurements of server traffic on an element-by-element basis and establishing a subset of URL's for each server, said subsets consisting of all URL's within said server cluster, wherein said URLs within each said subset are unique, are not found in any other subset and are not cached; and means for dividing all URLs into URL groups, by forming URL groups, wherein each URL group is based on a configuration of each particular said server;

means for providing each server with contents of a corresponding subset of URLs and activating said subset of URLs in each particular server, and means for updating URL links in each of the servers in accordance with said URL relocation, if relocated.

20. An article of manufacture comprising a computer usable medium having computer readable program code means embodied therein for causing a restructuring the content of 'N' servers in a server cluster, the computer readable program code means in said article of manufacture comprising computer readable program code means for causing a computer to effect:

obtaining, by a server site monitor, a log file from each of the servers included in said cluster;

said log file containing entry elements comprising URL, date/time and user information;

analyzing each entry element in each log file for a file relation by employing measurements of server traffic on an element-by-element basis and establishing a subset of URL's for each server, said subsets consisting of all URL's within said server cluster, wherein said URLs within each said subset are unique, are not found in any other subset and are not cached;

dividing all URLs into 'N' groups, by forming URL groups, wherein each URL group is based upon a configuration of each particular said server;

providing each server with contents of the corresponding subset of URLs and activating said subset of URLs in each particular server, and updating URL links in each of the servers in accordance with said URL relocation, if relocated.

21. The article of manufacture as recited in claim 20, the computer readable program code means in said article of manufacture comprising computer readable program code means for causing a computer to effect distributing each file group to a corresponding server.

22. The article of manufacture as recited in claim 21, the computer readable program code means in said article of manufacture comprising computer readable program code means for causing a computer to effect making available data corresponding to each file in the file group at the corresponding server.

23. A program storage device readable by a machine, tangibly embodying a program of instructions executable by the machine to perform method steps for restructuring content at a web site having a plurality of servers, the method steps comprising:

obtaining by a server site monitor a log file from each of said servers included in said plurality of servers;

said log file containing entry elements comprising URL, date/time and user information;

analyzing each said entry in each said log file for a URL relation by employing measurements of server traffic on an element-by-element basis and establishing a subset of URL's for each server, said subsets consisting of all URL's within said server cluster, wherein said URLs within each said subset are unique, are not found in any other subset and are not cached; and dividing all URLs into a plurality of URL groups, by forming URL groups, wherein each URL group is based upon a configuration of each particular said server;

providing each server with contents of a corresponding subset of URLs and activating said subset of URLs in each particular server, and updating URL links in each of the servers in accordance with said URL relocation, if relocated.

24. A program storage device readable by machine as recited in claim 23, said method steps further comprising distributing each URL group to a corresponding server.

25. A program storage device readable by machine as recited in claim 24, said method steps further comprising making available data corresponding to each file in a URL group at the corresponding server.

26. An apparatus comprising a 'monitoring process' and a 'server side or remote process' coupled to the 'monitoring process', in which:

the 'monitoring process' includes:

an 'event trigger module' to monitor and provide a trigger on an event;

a 'log file obtaining module' to obtain log files from each server in a cluster of servers;

a 'log file analyzer' to analyze the log files for a relation;

a 'file grouping and merging component' to form groups by merging files based on one or more relations;

a 'file distribution module' to distribute the file groups to the servers, and the 'server side' or 'remote process' includes:

a 'file receiver' to receive files as allocated for each server;

a 'file locator' to locate the files of each group to each server;

and a 'file link update component' to update the files in each of the servers as usage environment varies.

\* \* \* \* \*